US009510194B2

(12) United States Patent
Elliott

(10) Patent No.: US 9,510,194 B2
(45) Date of Patent: Nov. 29, 2016

(54) OPEN AND ENCRYPTED WIRELESS NETWORK ACCESS

(71) Applicant: Intel Corporation, Santa Clara, CA (US)

(72) Inventor: Brent Elliott, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 328 days.

(21) Appl. No.: 14/119,543

(22) PCT Filed: Jun. 28, 2013

(86) PCT No.: PCT/US2013/048683
§ 371 (c)(1),
(2) Date: Nov. 22, 2013

(87) PCT Pub. No.: WO2014/209380
PCT Pub. Date: Dec. 31, 2014

(65) Prior Publication Data
US 2016/0037337 A1    Feb. 4, 2016

(51) Int. Cl.
*H04L 9/08* (2006.01)
*H04W 12/06* (2009.01)
(Continued)

(52) U.S. Cl.
CPC ............ *H04W 12/06* (2013.01); *H04L 9/0866* (2013.01); *H04L 9/3263* (2013.01); *H04L 63/0428* (2013.01); *H04L 63/0823* (2013.01); *H04L 63/105* (2013.01)

(58) Field of Classification Search
CPC ...... H04W 12/06; H04L 9/00; H04L 9/0816; H04L 9/0866; H04L 9/088; H04L 9/32; H04L 9/321; H04L 9/3226; H04L 9/3247; H04L 9/3263; H04L 9/3268; H04L 63/00; H04L 63/04; H04L 63/08; H04L 63/0807; H04L 63/0823; H04L 63/12; H04L 2463/081
See application file for complete search history.

(56) References Cited

U.S. PATENT DOCUMENTS 7,117,359 B2 * 10/2006 Wood ...................... G06F 21/31
                                                        713/155
8,977,856 B2 *  3/2015 Malek ..................... H04L 29/06
                                                        713/171
(Continued)

FOREIGN PATENT DOCUMENTS

CA       EP 1890462 B1 * 12/2011  ............. H04L 29/06
KR       1020130055501 A      5/2013
WO       WO-2014209380 A1   12/2014

OTHER PUBLICATIONS

Byrd, Christopher "Open Secure Wireless" [Online], May 5, 2010 [Retrieved on: Apr. 1, 2016], www.riosec.com, Retrieved from: <https://web.archive.org/web/20131212085700/http://riosec.com/files/Open-Secure-Wireless.pdf >.*
(Continued)

*Primary Examiner* — Eric W Shepperd
(74) *Attorney, Agent, or Firm* — Schwegman Lundberg & Woessner, P.A.

(57) ABSTRACT

Embodiments of a system and method for establishing secure communications between devices via a wireless network are generally described herein. In some embodiments a device may transmit a public use credential to a second device to establish a secure device-to-device communication session. In some embodiments a device may prompt a user to provide a network-specific credential or utilize a public use credential to establish a communication session with an access point. In some embodiments a communication module in a device may automatically establish a connection with an access point utilizing a public use credential in response to a previously established relationship with the access point. In some embodiments a plurality of devices may establish unique encrypted communication connections with an access point utilizing an identical public use credential. In some embodiments an access point may provide a certificate identifying the access point to a device utilizing a public use credential.

11 Claims, 8 Drawing Sheets

(51) Int. Cl.
*H04L 29/06* (2006.01)
*H04L 9/32* (2006.01)

(56) References Cited

U.S. PATENT DOCUMENTS

| | | | |
|---|---|---|---|
| 9,049,632 B1* | 6/2015 | Shah | H04W 36/08 |
| 2003/0131096 A1* | 7/2003 | Goringe | H04L 63/08 709/224 |
| 2005/0163319 A1* | 7/2005 | Hancock | H04L 63/08 380/270 |
| 2007/0101400 A1* | 5/2007 | Freeman | H04L 9/0841 726/2 |
| 2008/0028206 A1* | 1/2008 | Sicard | H04L 63/0407 713/156 |
| 2009/0019528 A1* | 1/2009 | Wei | H04L 63/08 726/4 |
| 2010/0190497 A1* | 7/2010 | Pudney | H04W 12/08 455/435.1 |
| 2011/0119492 A1 | 5/2011 | Palanigounder et al. | |
| 2011/0269423 A1 | 11/2011 | Schell et al. | |
| 2011/0314522 A1 | 12/2011 | Palanigounder et al. | |
| 2012/0116782 A1* | 5/2012 | Punnoose | H04L 63/20 705/1.1 |
| 2013/0347073 A1* | 12/2013 | Bryksa | H04L 63/105 726/4 |

OTHER PUBLICATIONS

Byrd et al. "Secure Open Wireless Networking—Backup Talk for Blackhat USA 2011" [Online], 2011 [Retrieved on Apr. 1, 2016], media.blackhat.com, Retrieved from: < https://media.blackhat.com/bh-us-11/Arsenal/BH_US_11_Cross_Arsenal_Secure_Wireless_Slides.pdf >.*

"International Application Serial No. PCT/US2013/048683, International Search Report mailed Mar. 27, 2014", 3 pgs.

"International Application Serial No. PCT/US2013/048683, Written Opinion mailed Mar. 27, 2014", 6 pgs.

"International Application Serial No. PCT/US2013/048683, International Preliminary Report on Patentability mailed Jan. 7, 2016", 8 pgs.

* cited by examiner

OPEN AND ENCRYPTED WIRELESS NETWORK ACCESS

This application is a U.S. National Stage Filing under 35 U.S.C. 371 from International Application No. PCT/US2013/048683, filed on Jun. 28, 2013, which is incorporated herein by reference in its entirety.

TECHNICAL FIELD

Embodiments pertain to wireless communications. Some embodiments relate to the use of encrypted wireless communication. Some embodiments relate to secure discovery and communication between devices in a wireless network.

BACKGROUND

An issue with providing wireless network access is the choice between network availability to the public and encrypted wireless transmission. In an open network anyone can connect to the network, but information can easily be extracted from user traffic communicating over the network by third parties. In an encrypted network that prevents third-party interception, the complexity of creating user profiles and the lack of widespread provisioning mechanisms may prevent or discourage users from easily connecting to the more secure encrypted network.

Thus there are general needs for systems and methods that reduce complexity of connecting to encrypted networks, while allowing users or devices to securely discover and communicate with each other in a secure manner.

BRIEF DESCRIPTION OF THE DRAWINGS

Some embodiments are illustrated by way of example and not limitation in the figures of the accompanying drawings in which.

DETAILED DESCRIPTION

Figure 1:
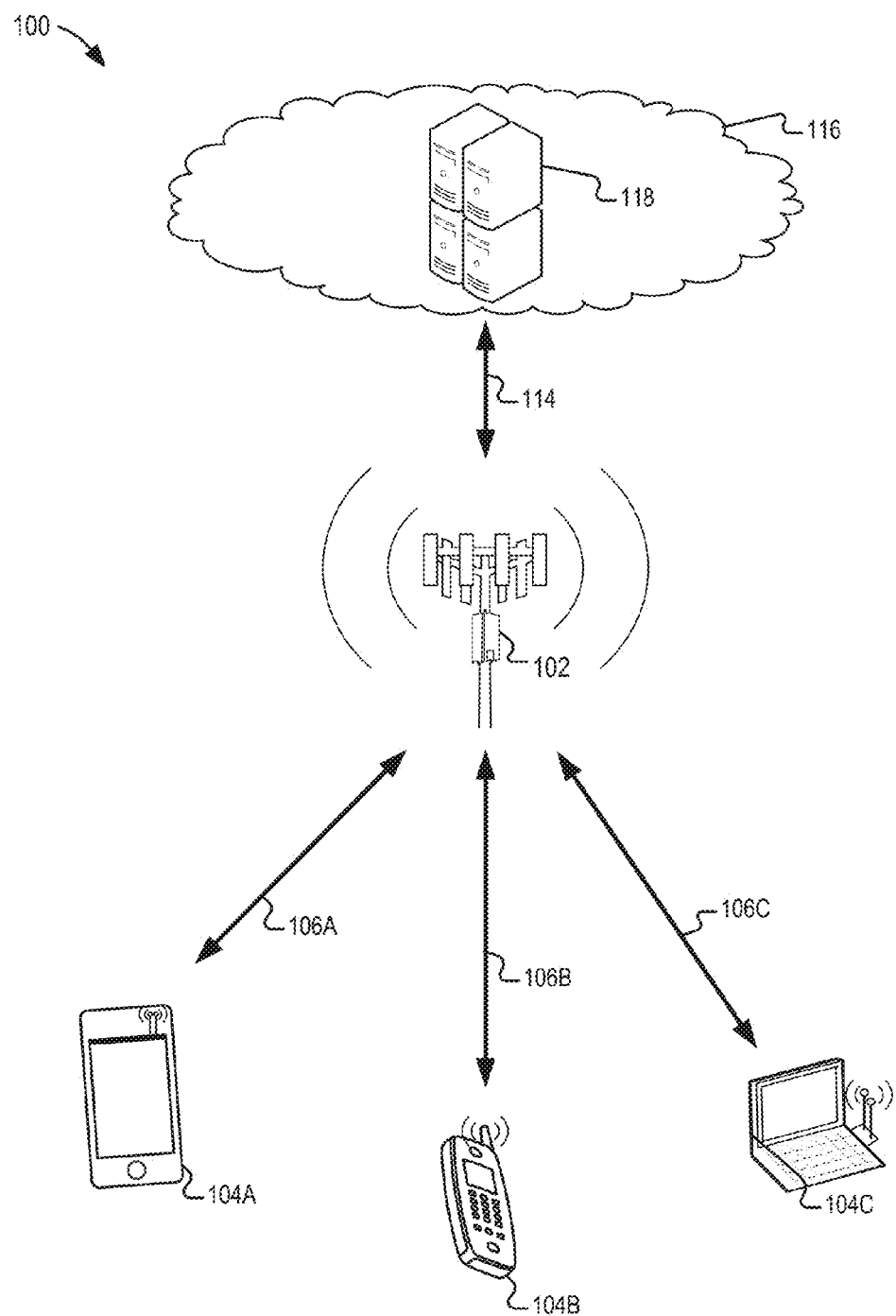
FIG. 1 is a block diagram of an example communication system in accordance with some embodiments.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Various techniques and configurations described herein provide for a network awareness and discovery technique used in conjunction with wireless communications and network communications. The presently described network discovery and connection techniques may be used in conjunction with an authentication technique establishing an authenticated or secure communication channel between devices. For example, a wireless local area network (e.g., Wi-Fi) may be based on or compatible with one of the Institute of Electrical and Electronics Engineers (IEEE) 802.11 standards.

With some network technologies, discovery and authentication uses an exchange of authentication keys, verification of identifiers via a server, or other broadcasts, exchanges, and provisions of previously established credentials. For example, wireless techniques employing Wi-Fi Protected Access with Pre-shared Keys (WPA-PSK) or WPA2-PSK (a.k.a., WPA-Personal or WPA2-Personal) have been introduced but offer virtually no security in an open access point (e.g., Hotspot) setting. In this public setting such as a coffee shop, a pre-shared key must be made available to the broad public (e.g., posted publicly on a chalkboard in a coffee shop) in order to enable the general public access. However, the implementations of WPA-PSK and WPA2-PSK are such that any user with access to the broadly available pre-shared key may decode the communications of any other user on the network. As a result, pubic wireless network access providers have typically provided unencrypted and open network access in spite of the risks associated with the security and privacy of the customers, partners, employees, or other users of these open networks.

In connection with the presently described techniques, a wireless communications device is enabled to discover and establish a connection with a wireless communications access point without the use of a previously established credential that is unique to the device or a user of the device. In an example embodiment, one or more predefined de facto or standardized public use credentials (PUC) may be utilized during authentication by a wireless device when associating with a WPA-ENTERPRISE or WPA2-ENTERPRISE configured network without the need for existing provisioned or configured credentials specific to the wireless device or user.

The discovery and authentication techniques may facilitate connections established using any of a variety of network protocols and standards in licensed or unlicensed spectrum bands, including Wi-Fi communications performed in connection with an IEEE 802.11 standard (for example, Wi-Fi communications facilitated by fixed access points), 3GPP LTE/LTE-A communications (for example, LTE Direct (LTE-D) communications established in a portion of an uplink segment or other designated resources), machine-to-machine (M2M) communications performed in connection with an IEEE 802.16 standard, and the like.

FIG. 1 provides an illustration of an example configuration of a communication network architecture 100. Within the communication network architecture 100, a carrier-based network such as an IEEE 802.11 compatible wireless access point or a LTE/LTE-A cell network operating according to a standard from a 3 GPP standards family is established by network equipment 102. The network equipment 102 may include a wireless access point, a Wi-Fi hotspot, or an enhanced or evolved node B (eNodeB) communicating with communication devices 104A, 104B, 104C (e.g., a user equipment (UE) or communication station (STA)). The carrier-based network includes wireless network connections 106A, 106B, and 106C with the communication devices 104A, 104B, and 104C, respectively. The communication devices 104A, 104B, 104C are illustrated as conforming to a variety of form factors, including a smartphone, a mobile phone handset, and a personal computer having an integrated or external wireless network communication device.

The network equipment 102 is illustrated in FIG. 1 as being connected via a network connection 114 to network servers 118 in a cloud network 116. The servers 118 may operate to provide various types of information to, or receive information from, communication devices 104A, 104B, 104C, including device location, user profiles, user information, web sites, e-mail, and the like. The techniques described herein enable the establishment of communications between the various communication devices 104A, 104B, 104C, and the network equipment 102 without requiring authentication techniques to the cloud network 116 and the network servers 118.

Communication devices 104A, 104B, 104C can communicate with the network equipment 102 when in range or otherwise in proximity for wireless communications. As illustrated, the connection 106A may be established between the mobile device 104A (e.g., a smartphone) and the network equipment 102; the connection 106B may be established between the mobile device 104B (e.g., a mobile phone) and the network equipment 102; and the connection 106C may be established between the mobile device 104C (e.g., a personal computer) and the network equipment 102.

The wireless communications 106A, 106B, 106C between devices 104A, 104B, 104C may utilize a Wi-Fi or IEEE 802.11 standard protocol, or a protocol such as the current 3rd Generation Partnership Project (3GPP) long term evolution (LTE) time division duplex (TDD)-Advanced systems. In one embodiment, the communications network 116 and network equipment 102 comprises an evolved universal terrestrial radio access network (EUTRAN) using the 3rd Generation Partnership Project (3GPP) long term evolution (LTE) standard and operating in time division duplexing (TDD) mode. The devices 104A, 104B, 104C may include one or more antennas, receivers, transmitters, or transceivers that are configured to utilize a Wi-Fi or IEEE 802.11 standard protocol, or a protocol such as 3GPP, LTE, or TDD-Advanced or any combination of these or other communications standards.

In establishing a connection between a wireless communication device and an access point, public use credential authentication techniques may provide for an exchange of authentication information and discovery information to establish a unique and secure communication session. For example, when a user or automated process triggers an attempt by a device to connect to a securely configured network (e.g., an encrypted network), the device will first attempt to associate with credentials that are provisioned or otherwise configured on the device. If these are not available, connection management or connection enhancement software running on the device may automatically attempt to authenticate with one or more public use credentials or may prompt the user with the option to attempt authentication with the public use credentials or to offer their own credentials e.g., a username and password. In the event that a first public use credential fails authentication, the device may attempt to use a secondary public use credential, may prompt the user to provide their personal credentials, or may simply fail the association with the currently selected network.

The secure network may include a network configured to conform to a WPA-ENTERPRISE or WPA2-ENTERPRISE security protocol. In comparison with the WPA-PSK and WPA2-PSK network example, the existing implementation and standards defining the WPA-ENTERPRISE and WPA2-ENTERPRISE protocols ensures full encryption of the communications between devices, even those devices using identical public use credentials. For example, the IEEE 802.11i security standard (e.g., IEEE 802.11i-2004) with CCMP/AES encryption specifies security mechanisms for wireless networks that may prevent the interception of wireless communication between devices such as network equipment 102 and communication devices 104A, 104B, 104C.

The discovery and authentication techniques may also facilitate connections established using any of a variety of network protocols and standards in licensed or unlicensed spectrum bands, including Wi-Fi P2P communications performed in connection with an IEEE 802.11 standard (for example, Wi-Fi Direct communications facilitated by software access points (Soft APs)), 3GPP LTE/LTE-A communications (for example, LTE Direct (LTE-D) communications established in a portion of an uplink segment or other designated resources), machine-to-machine (M2M) communications performed in connection with an IEEE 802.16 standard, and the like.

Antennas in or on devices 104A, 104B, 104C may comprise one or more directional or omnidirectional antennas, including, for example, dipole antennas, monopole antennas, patch antennas, loop antennas, microstrip antennas or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, antennas may be effectively separated to utilize spatial diversity and the different channel characteristics that may result between each of the antennas and the antennas of a transmitting station. In some MIMO embodiments, antennas may be separated by up to $\frac{1}{10}$ of a wavelength or more.

In some embodiments, the mobile device 104A may include one or more of a keyboard, a display, a non-volatile memory port, multiple antennas, a graphics processor, an application processor, speakers, and other mobile device elements. The display may be an LCD screen including a touch screen. The mobile device 104B may be similar to mobile device 104A, but does not need to be identical. The mobile device 104C may include some or all of the features, components, or functionality described with respect to mobile device 104A.

A base station, such as an enhanced or evolved node B (eNodeB), may provide wireless communication services to communication devices, such as device 102. While the exemplary communication system 100 of FIG. 1 depicts only three devices users 104A, 104B, 104C any combination of multiple users, devices, servers and the like may be coupled to network device 102 in various embodiments. For example, three or more users located in a venue, such as a building, campus, mall area, or other area, and may utilize any number of mobile wireless-enabled computing devices to independently communicate with network equipment 102.

Although communication system 100 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, application specific integrated circuits (ASICs), radio-frequency integrated circuits (RFICs) and combinations of various hardware and logic circuitry for performing at least the functions described herein. In some embodiments, the functional elements of system 100 may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, system 100 may include one or more processors and may be configured with instructions stored on a computer-readable storage device.

Figure 2:
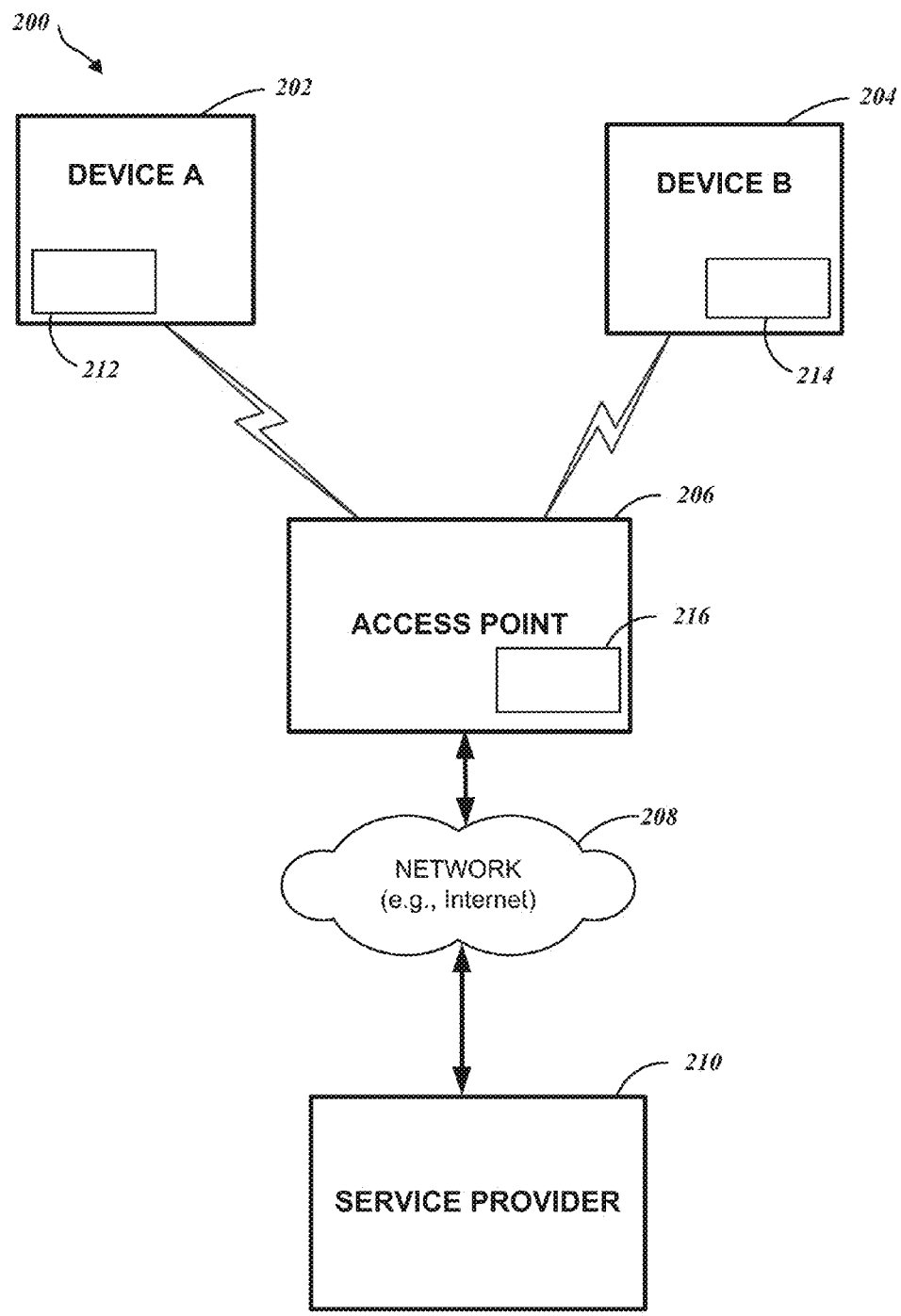
FIG. 2 is a block diagram of an example wireless communication system in accordance with some embodiments.

FIG. 2 is a block diagram of an example wireless communication system 200 that may utilize the communication network architecture 100 of FIG. 1. The exemplary communication system 200 may include a first device 202 and a second device 204 that are both capable of wireless communication. In an example, the first device 202 and the second device 204 may be a mobile computing device such as a cellular phone, a smartphone, a laptop, a tablet computer, a personal digital assistant or other electronic device. An access point 206 may, for example, be a base station or a fixed wireless router. The devices 202, 204 may establish a communication session with the access point 206 in order to reach a network 208 such as the Internet. In an example, the devices 202, 204 may communicate with a service provider 210 through the network 208.

In an example, the access point 206 may support both an open and unencrypted networks to support legacy devices. An access point operator may advertise these networks as having an alternative secure option, or encourage users to transition to the more secure network. For example, a grocery store may offer an open extended service set identification (ESSID) or service set identification (SSID) such as, "Grocery—Open", and also offer an encrypted network ESSID or SSID such as, "Grocery—Secure". The grocery store in this example may add a PUC to the authentication database for an existing "Grocery—Secure" network, or create the Grocery-Secure ESSID at access point 206 and configure it to use WPA-ENTERPRISE or WPA2-Enterprise with the PUC to the referenced new or existing authentication database with a valid authentication certificate.

The PUC may be used by any wireless authentication mechanism. These include, but are not limited to, Protected Extensible Authentication Protocol (PEAP) or Microsoft Challenge Handshake Protocol, version 2 (MSCHAPv2), Extensible Authentication Protocol with Tunneled Transport Layer Security (EAP-TTLS), Extensible Authentication Protocol with Transport Layer Security (EAP-TLS), etc. The PUC does not need to be visible to an end-user of a PUC-enabled device, the language and contents of the credentials need not be recognizable or remembered by users. For example, an embodiment may define the credential type, username and password either as a de-facto or standardized to be PEAP/MSCHAPv2 with a username of "public-use" and a password of "RESERVED-public-password-00".

In an example, a device may attempt to establish a secure device-to-device communication session with an access point of an encrypted wireless network with a first class of credential, the first class of credential may be specific to an individual user. In response to a failure to connect with the first class of credential, the device may attempt to connect to the access point with a second class of credential where the second class of credential may be specific to an organization. In response to a failure to establish the secure device-to-device communication session with the access point with the second class of credential, the device may attempt to connect to the access point with the pre-configured public-use credential.

Different credential types or classes such as organization specific, de facto or industry standards may provide wireless access point 206 a measure of flexibility in the type of credential that may be implemented in a network. In the case of a failure to determine the preferred or supported credential type for a public use credential, a default credential type and corresponding credentials may be defined. As in the above example, this may for example be PEAP/MSCHAPv2 with username "public-use" and password "RESERVED-public-password-00".

The device 202 may establish an encrypted communication session with the access point 206 by providing a public use credential to the access point 206 as part of initiating a secure device-to-device communication session. The device 204 may use a public use credential to connect with the access point 206 that is identical to the public use credential provided to the access point 206. The access point 206 may support encrypted device-to-device communication sessions with both device 202 and the device 204 such that neither device 202 nor device 204 is able to inject or intercept data (e.g., data packets) associated with the other device.

The device-to-device communication session initiated with the use of the public use credential may be established for wireless communication at a data link or network layer that provides an interface between a device and an access point, or two devices, and is separate from higher layer (e.g., application layer) data communication. For example, data communication between device 202 and service provider 210 may utilize a separate encryption mechanism or protocol (e.g., TLS/SSL SSH, etc.) that encrypts or authenticates communications that span multiple devices, network equipment, or networks.

Generally, WPA-ENTERPRISE and WPA2-ENTERPRISE compliant networks may include, for various credential types, network infrastructure equipment that offers a public certificate signed by an authority that is known and trusted by the client devices. For example, the access point 206 may include a public certificate 216 that has been signed by an authority that is known and trusted by the client devices such as the first device 202 or the second device 204. Devices 202, 204 may optionally have credential data or may be configured to obtain information to ensure that the access point 206 with which it is authenticating contains the legitimate private key (e.g., public certificate 216) corresponding to the credentials expected for the access point 206.

Upon successful association between a device and an access point using a public use credential, a connection manager module 212 or connection enhancement module 214 on the device 202 or device 204 may create a profile to enable accelerated or prioritized selection and connection to the access point in the futures using the public use credential. For appropriate credential types, a fingerprint or other identifying information regarding the public certificate provided by the access point 206 with a specific ESSID may be stored by the device 202, 204 to ensure that subsequent associations are not fraudulent. This fraud protection may include determining whether the public certificate provided by the access point comes from the same trust authority and contains the same encrypted information associated with the original connection with the access point. A determination that the public certificate is invalid or has changed may result in a request to verify the legitimacy of the newly provided public certificate, or a failure of the device 202, 204 to connect with the access point 206.

Figure 3:
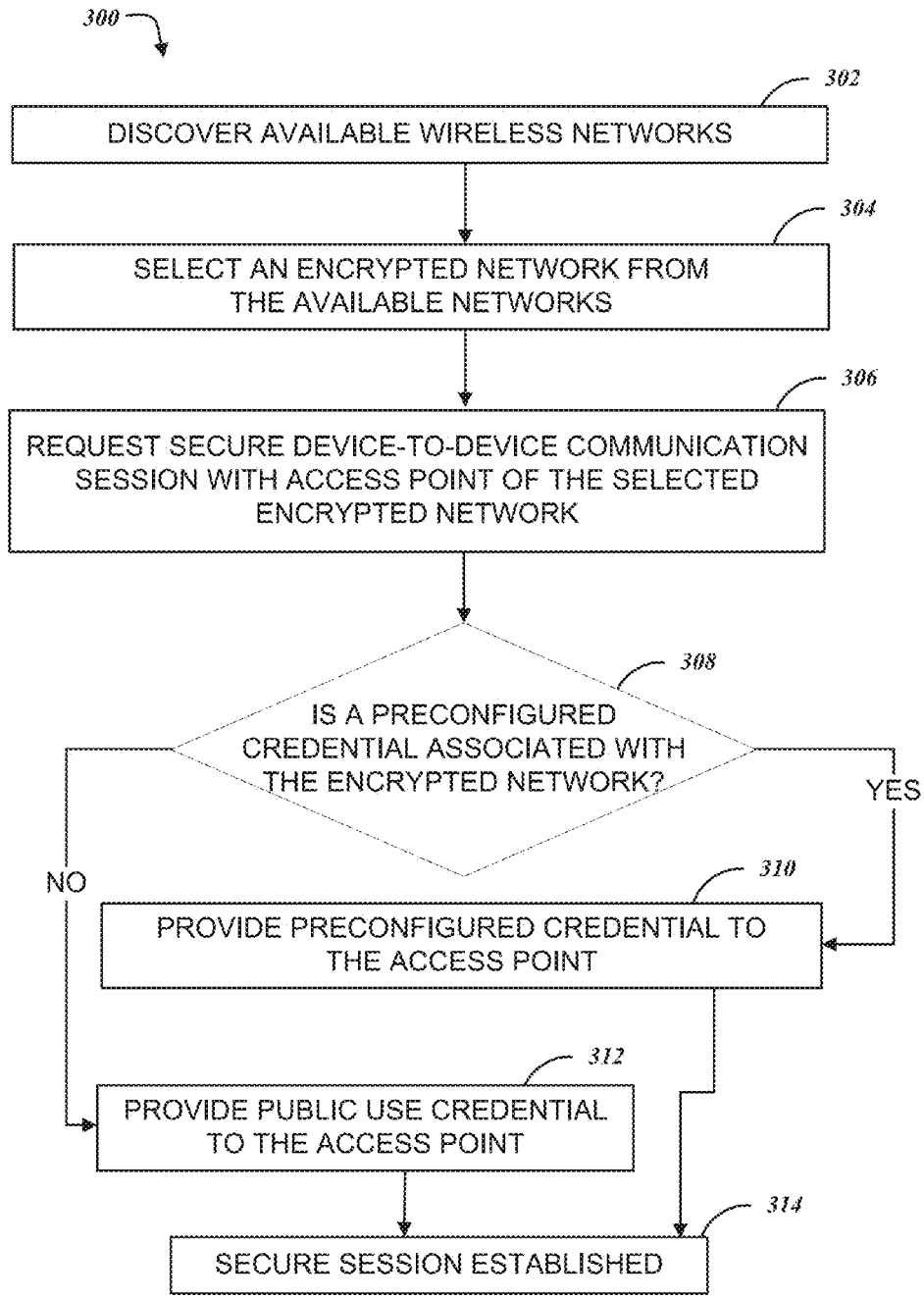
FIG. 3 is a flow diagram illustrating an example method for establishing communication between devices in accordance with some embodiments.

FIG. 3 is a flowchart illustrating an example method 300 for establishing communication between devices. In an example, the method 300 may be performed by device 202 of FIG. 2 in an attempt to establish a communication session with access point 206 of FIG. 2.

At 302, a device may attempt to discover available wireless networks. The wireless networks may utilize a Wi-Fi or IEEE 802.11 standard protocol, or a protocol such as the current 3GPP, LTE, or TDD-Advanced. The device may attempt to discover one or more ESSID being broadcast by an access point or other network equipment. The wireless networks may be open (e.g., unencrypted) or encrypted.

At 304, the device may select an encrypted network from the available networks. The selection may be based upon a list of networks the device has previously connected to, a list of networks provided by a user or otherwise indicated as being desirable, or the properties (e.g., protocol compatibility) of the encrypted network.

At 306, the device may request a secure device-to-device communication session with an access point of the selected encrypted network. The request may conform to a wireless protocol (e.g., WPA-ENTERPRISE or WPA2-ENTERPRISE) that defines a handshake procedure for establishing a secure communication session.

At 308, the device may check to determine if it has a preconfigured credential is associated with the encrypted network. The preconfigured credential may include a username and password combination provided by an end-user to the device, or a public key configured to allow the device to access the network coupled to the access point. If the device determines that it has a preconfigured credential then, at 310, the preconfigured credential is provided to the access point. If the device determines that it does not have a preconfigured credential associated with the encrypted network then, at 312, the device may provide a public use credential to the access point. At 314, a secure session is established between the device and the access point based on either the preconfigured credential or the public use credential.

The device may optionally create a record of the secure session established with the access point in order to verify the integrity of future sessions where the public use credential is utilized to connect to the access point. These operations may also be performed by the device 104A, or a combination of devices 104B, 104C or processors in communication with network equipment 102 of FIG. 1.

Though arranged serially in the example of FIG. 3, other examples may reorder the operations, omit one or more operations, and/or execute two or more operations in parallel using multiple processors or a single processor organized as two or more virtual machines or sub-processors. Moreover, still other examples may implement the operations as one or more specific interconnected hardware or integrated circuit modules with related control and data signals communicated between and through the modules. Thus, any process flow is applicable to software, firmware, hardware, and hybrid implementations.

Figure 4:
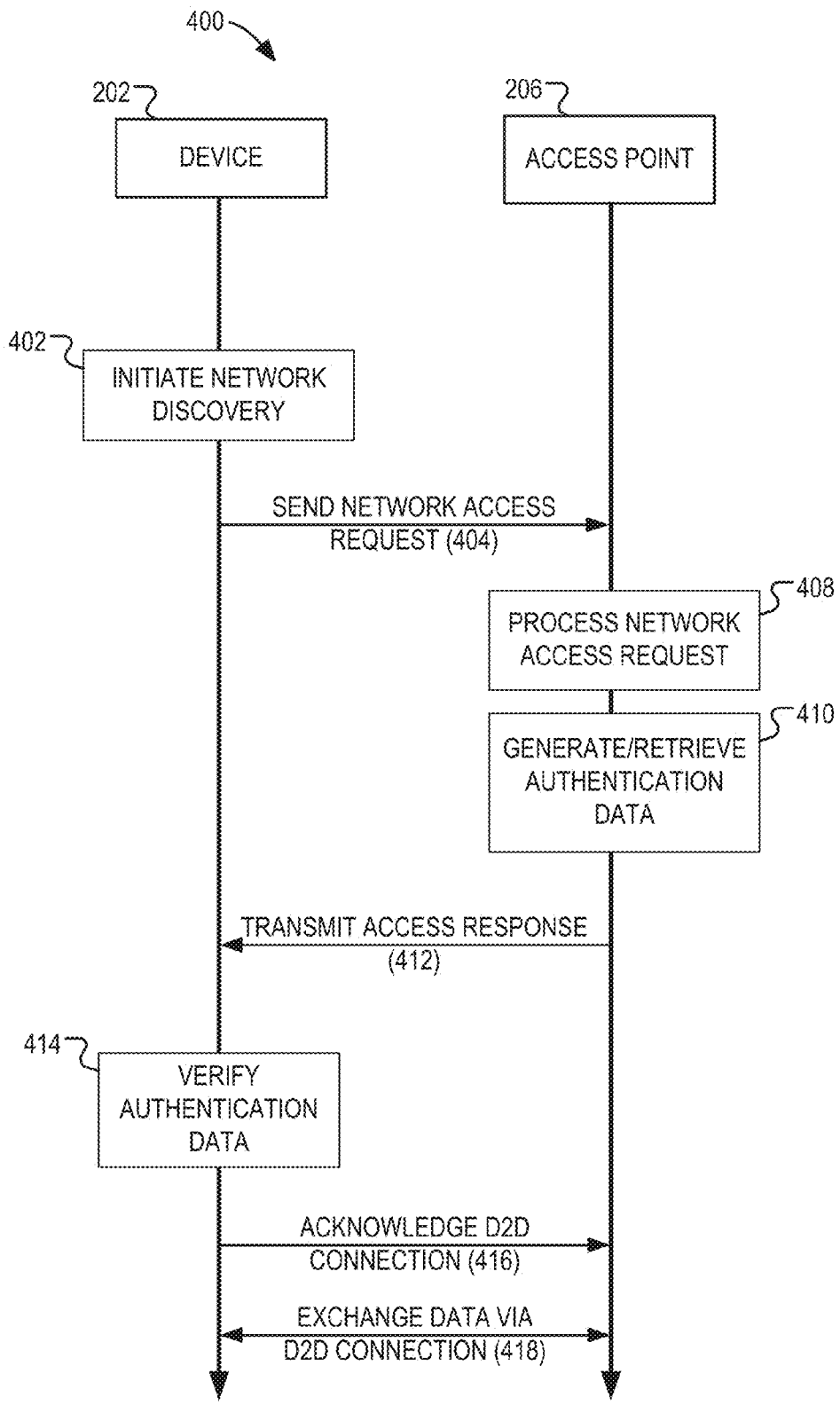
FIG. 4 is a swim-lane chart illustrating the operation of a method for discovery and authentication of a device with a network in accordance with some embodiments.

FIG. 4 is a swim-lane chart illustrating the operation of a method 400 for discovery and authentication of a device with a network in accordance with some embodiments, such as the device 202 and the access point 206 of FIG. 2.

At 402, the method 400 may begin with the device 202 attempting to initiate network discovery. Network discovery may include receiving one or more network identifiers, e.g., ESSID, that are broadcast by one or more network equipment within range of the device 202. Upon receipt of a network identifier that is known to the device 202 or compatible with a wireless protocol supported by device 202, at 404, the device 202 may send a network access request 404 to the access point 206 that is broadcasting the selected network identifier.

At 408, the method 400 may continue with the access point 206 processing the network access request from the device 202. In response to the request, at 410, the access point 206 may generate or retrieve authentication data to establish a secure session between the device 202 and the access point 206.

At 412, the access point 206 may transmit an access response to the device 202. The access response may include the authentication data. The authentication data may include an encrypted public certificate provided to the access point 206 by a trusted authority verifying the identity of a service provider that operates the access point 206 or a network coupled to the access point.

Upon receipt of the access response, at 414, the device 202 may verify the authentication data. The verification may include attempting to confirm the validity of the encrypted public certificate, or performing a check to determine if the encrypted public certificate originated from a trusted authority. At 416, the device, upon verifying the authentication data, may acknowledge that a secure device-to-device connection is established between the device 202 and the access point 206. The method 400 is complete at 418, when the device 202 and the access point 206 exchange data securely via the device-to-device connection.

Optionally, method 400 may include one or more operations defined by any of a variety of network protocols and standards in licensed or unlicensed spectrum bands, including Wi-Fi P2P communications performed in connection with an IEEE 802.11 standard (for example, Wi-Fi Direct communications facilitated by software access points (Soft APs)), 3GPP LTE/LTE-A communications (for example, LTE Direct (LTE-D) communications established in a portion of an uplink segment or other designated resources), machine-to-machine (M2M) communications performed in connection with an IEEE 802.16 standard, and the like.

Figure 5:
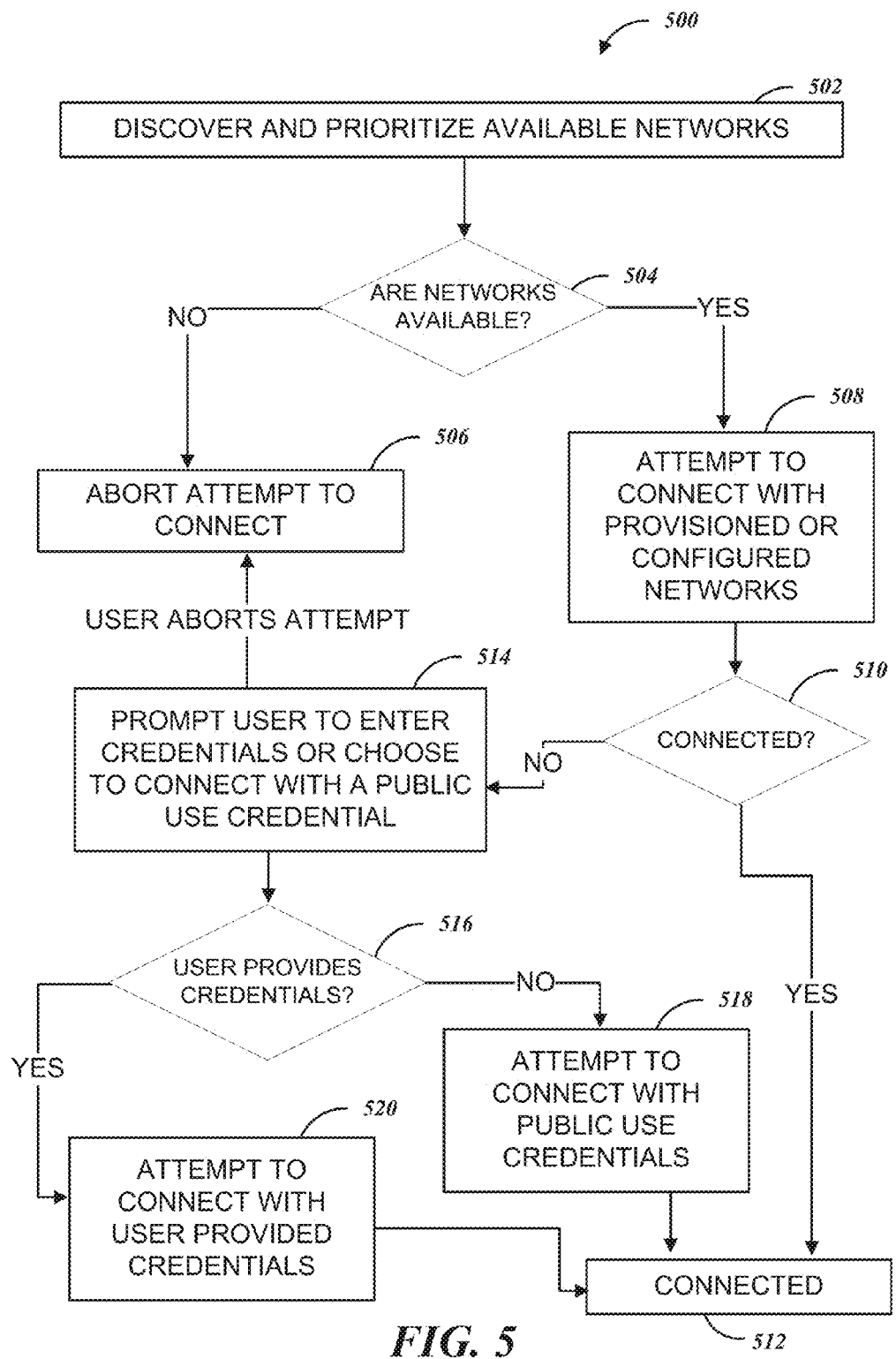
FIG. 5 is flow diagram a illustrating the operation of an example method for connecting to a network in accordance with some embodiments.

FIG. 5 illustrates the operation of a method 500 illustrating the operation of an example method for connecting to a network. At 502, a communication station (STA) or user equipment (UE) device may discover any available wireless networks and prioritize the available networks upon discovery. The device may periodically perform a check, at 504, to query whether any wireless networks are available. If no wireless networks are available the device, at 506, may abort its attempt to connect to a network. If one or more wireless networks are available, at 508, the device may attempt to connect with any previously provisioned or configured networks. In this manner priority is given to networks that the devices has previously connected with, or has been explicitly configured to favor.

At 510, the device may check to determine if a connection has been established with one of the provisioned or configured networks. If a secure connection is established, at 512, the method 500 may terminate. If the device determines that a connection cannot be established with a preconfigured or previously known network, at 514, the device may prompt a user to enter credentials specific to one or more of the available networks (e.g., a user name and password combination) or choose to connect to a network utilizing a public use credential. The use may also choose to abort the connection attempt and, at 506, the attempt to connect will terminate. At 516, the user may be provide user credentials.

At 518, upon selection of the public use credential option by the user, or an indication that the user does not possess a network specific credential, the device may attempt to connect to the access point with a public use credential. The public use credential may be a predefined de facto identity, or a standardized character string or sequence that is not unique to the device or to an access point that the device is attempting to establish a connection with. If the user chooses to provide a specific credential, at 520, the device may attempt to connect to the access point with the user provided credential. The method 500 is complete at 512, when a secure communication session is established between the device and the access point (e.g., the device and the access point are connected by a device-to-device connection).

Though arranged serially in the example of FIG. 5, other examples may reorder the operations, omit one or more operations, and/or execute two or more operations in parallel using multiple processors or a single processor organized as two or more virtual machines or sub-processors. Moreover, still other examples may implement the operations as one or more specific interconnected hardware or integrated circuit modules with related control and data signals communicated between and through the modules. Thus, any process flow is applicable to software, firmware, hardware, and hybrid implementations.

Although the preceding examples indicated the use of device-to-device communications in connection with 3GPP and 802.11 standard communications, it will be understood that a variety of other communication standards capable of facilitating device-to-device, machine-to-machine, and P2P communications may be used in connection with the presently described techniques. These standards include, but are not limited to, standards from 3GPP (e.g., LTE, LTE-A, HSPA+, UMTS), IEEE 802.11 (e.g., 802.11a, 802.11b, 802.11g, 802.11n, 802.11ac), 802.16 (e.g., 802.16p), or Bluetooth (e.g., Bluetooth 4.0, or other standard defined by the Bluetooth Special Interest Group) standards families. Bluetooth, as used herein, may refer to a short-range digital communication protocol defined by the Bluetooth Special Interest Group, the protocol including a short-haul wireless protocol frequency-hopping spread-spectrum (FHSS) communication technique operating in the 2.4 GHz spectrum.

Figure 6:
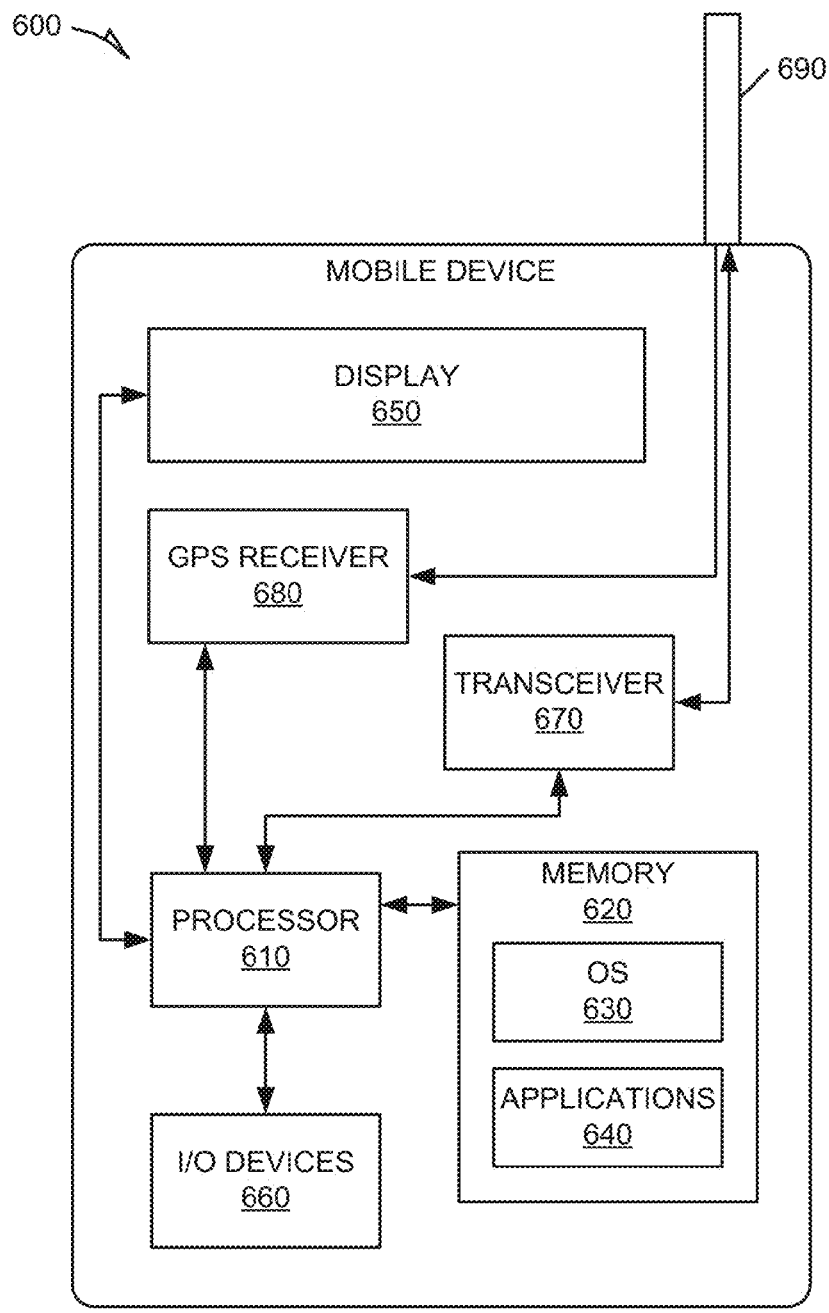
FIG. 6 is a block diagram illustrating a mobile device in accordance with some embodiments.

FIG. 6 is a block diagram illustrating a mobile device 600, upon which any one or more of the techniques (e.g., methodologies) discussed herein may be performed. The mobile device 600 may include a processor 610. The processor 610 may be any of a variety of different types of commercially available processors suitable for mobile devices, for example, an XScale architecture microprocessor, a Microprocessor without Interlocked Pipeline Stages (MIPS) architecture processor, or another type of processor. A memory 620, such as a Random Access Memory (RAM), a Flash memory, or other type of memory, is typically accessible to the processor 610. The memory 620 may be adapted to store an operating system (OS) 630, as well as application programs 640. The OS 630 or application programs 640 may include instructions stored on a computer readable medium (e.g., memory 620) that may cause the processor 610 of the mobile device 600 to perform any one or more of the techniques discussed herein. The processor 610 may be coupled, either directly or via appropriate intermediary hardware, to a display 650 and to one or more input/output (I/O) devices 660, such as a keypad, a touch panel sensor, a microphone, etc. Similarly, in an example embodiment, the processor 610 may be coupled to a transceiver 670 that interfaces with an antenna 690. The transceiver 670 may be configured to both transmit and receive cellular network signals, wireless data signals, or other types of signals via the antenna 690, depending on the nature of the mobile device 600. Further, in some configurations, a GPS receiver 680 may also make use of the antenna 690 to receive GPS signals.

Figure 7:
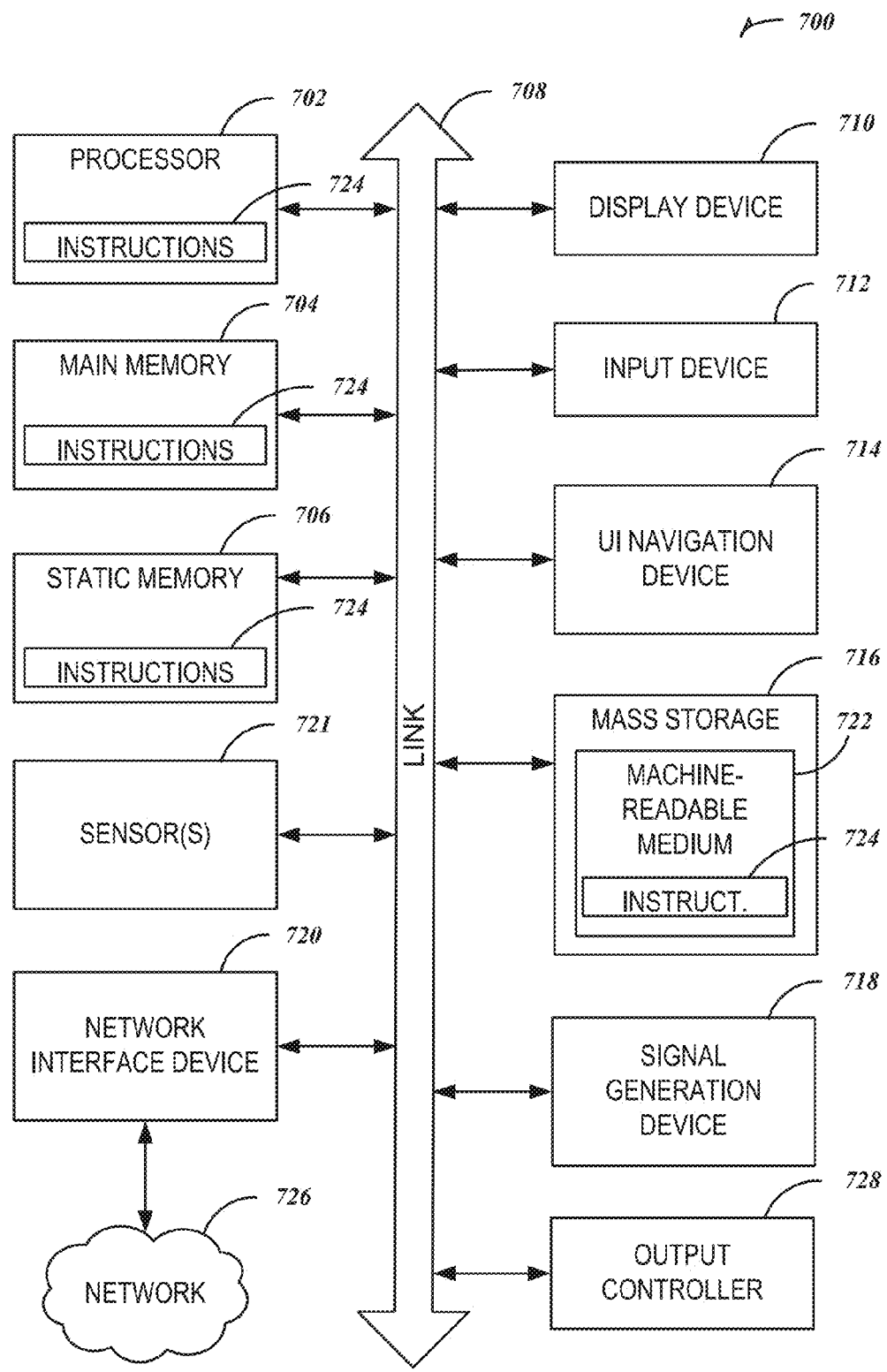
FIG. 7 is a diagrammatic representation of a machine in the example form of a computer system within which a set of instructions for causing the machine to perform any one or more of the methodologies discussed herein may be executed.

FIG. 7 illustrates a block diagram of an example machine 700 upon which any one or more of the techniques (e.g., methodologies) discussed herein may be performed. In alternative embodiments, the machine 700 may operate as a standalone device or may be connected (e.g., networked) to other machines. In a networked deployment, the machine 700 may operate in the capacity of a server machine, a client machine, or both in server-client network environments. In an example, the machine 700 may act as a peer machine in peer-to-peer (P2P) (or other distributed) network environment. The machine 700 may be a personal computer (PC), a tablet PC, a Personal Digital Assistant (PDA), a mobile telephone, a web appliance, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside (1) on a non-transitory machine-readable medium or (2) in a transmission signal. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 700 may include a hardware processor 702 (e.g., a processing unit, a graphics processing unit (GPU), a hardware processor core, or any combination thereof), a main memory 704, and a static memory 706, some or all of which may communicate with each other via a link 708 (e.g., a bus, link, interconnect, or the like). The machine 700 may further include a display device 710, an input device 712 (e.g., a keyboard), and a user interface (UI) navigation device 714 (e.g., a mouse). In an example, the display device 710, input device 712, and UI navigation device 714 may be a touch screen display. The machine 700 may additionally include a mass storage (e.g., drive unit) 716, a signal generation device 718 (e.g., a speaker), a network interface device 720, and one or more sensors 721, such as a global positioning system (GPS) sensor, camera, video recorder, compass, accelerometer, or other sensor. The machine 700 may include an output controller 728, such as a serial (e.g., universal serial bus (USB), parallel, or other wired or wireless (e.g., infrared (IR)) connection to communicate or control one or more peripheral devices (e.g., a printer, card reader, etc.).

The mass storage 716 may include a machine-readable medium 722 on which is stored one or more sets of data structures or instructions 724 (e.g., software) embodying or utilized by any one or more of the techniques or functions described herein. The instructions 724 may also reside, completely or at least partially, within the main memory 704, within static memory 706, or within the hardware processor 702 during execution thereof by the machine 700. In an example, one or any combination of the hardware processor 702, the main memory 704, the static memory 706, or the mass storage 716 may constitute machine-readable media.

While the machine-readable medium 722 is illustrated as a single medium, the term "machine readable medium" may include a single medium or multiple media (e.g., a centralized or distributed database, and/or associated caches and servers) that configured to store the one or more instructions 724.

The term "machine-readable medium" may include any tangible medium that is capable of storing, encoding, or carrying instructions for execution by the machine 700 and that cause the machine 700 to perform any one or more of the techniques of the present disclosure, or that is capable of storing, encoding or carrying data structures used by or associated with such instructions. Non-limiting machine-readable medium examples may include solid-state memories, and optical and magnetic media. Specific examples of machine-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 724 may further be transmitted or received over a communications network 726 using a transmission medium via the network interface device 720 utilizing any one of a number of transfer protocols (e.g., frame relay, internet protocol (IP), transmission control protocol (TCP), user datagram protocol (UDP), hypertext transfer protocol (HTTP), etc.). The term "transmission medium" shall be taken to include any intangible medium that is capable of storing, encoding or carrying instructions for execution by the machine 700, and includes digital or analog communications signals or other intangible medium to facilitate communication of such software.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media.

Figure 8:
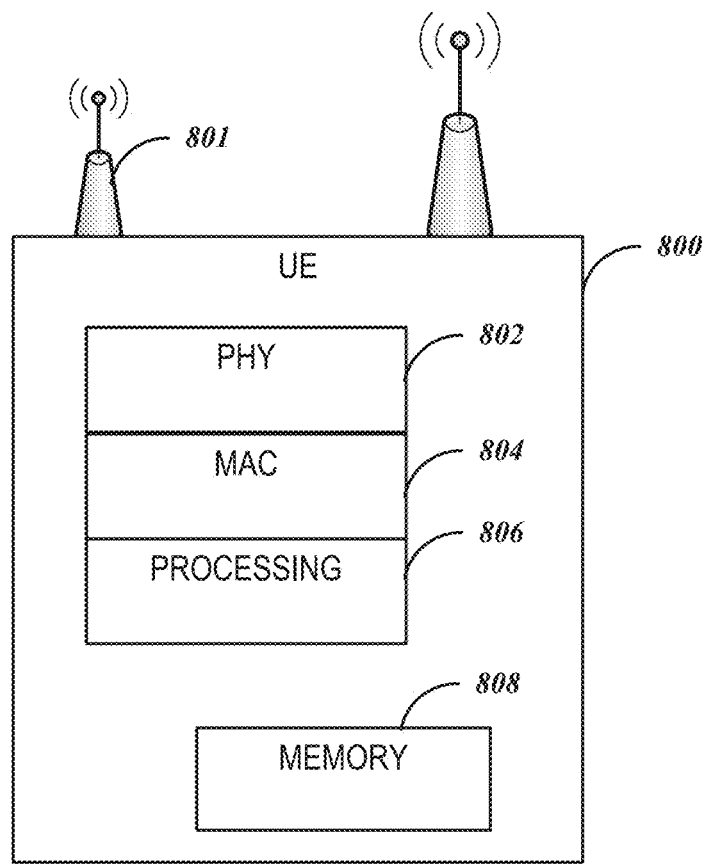
FIG. 8 illustrates a functional block diagram of user equipment (UE) in accordance with some embodiments.

FIG. 8 illustrates a functional block diagram of a UE 800 in accordance with some embodiments. The UE 800 may be suitable for use as device 112 (FIG. 1) or device 202 (FIG. 2). The UE 800 may include physical layer circuitry 802 for transmitting and receiving signals to and from eNBs using one or more antennas 801. UE 800 may also include processing circuitry 806 that may include, among other things a channel estimator. UE 800 may also include a memory 808. The processing circuitry may be configured to determine several different feedback values discussed below for transmission to the eNB. The processing circuitry may also include a media access control (MAC) layer 804.

In some embodiments, the UE 800 may include one or more of a keyboard, a display, a non-volatile memory port, multiple antennas, a graphics processor, an application processor, speakers, and other mobile device elements. The display may be an LCD screen including a touch screen.

The one or more antennas 801 utilized by the UE 800 may comprise one or more directional or omnidirectional antennas, including, for example, dipole antennas, monopole antennas, patch antennas, loop antennas, microstrip antennas or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated to take advantage of spatial diversity and the different channel characteristics that may result between each of antennas and the antennas of a transmitting station. In some MIMO embodiments, the antennas may be separated by up to $1/10$ of a wavelength or more.

Although the UE 800 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Embodiments may be implemented in one or a combination of hardware, firmware and software. Embodiments may also be implemented as instructions stored on a computer-readable storage medium, which may be read and executed by at least one processor to perform the operations described herein. A computer-readable storage medium may include any non-transitory mechanism for storing information in a form readable by a machine (e.g., a computer). For example, a computer-readable storage medium may include read-only memory (ROM), random-access memory (RAM), magnetic disk storage media, optical storage media, flash-memory devices, and other storage devices and media. In these embodiments, one or more processors of the UE 800 may be configured with the instructions to perform the operations described herein.

In some embodiments, the UE 800 may be configured to receive OFDM communication signals over a multicarrier communication channel in accordance with an OFDMA communication technique. The OFDM signals may comprise a plurality of orthogonal subcarriers. In some broadband multicarrier embodiments, eNBs (including macro eNB and pico eNBs) may be part of a broadband wireless access (BWA) network communication network, such as a Worldwide Interoperability for Microwave Access (Wi-MAX) communication network or a 3rd Generation Partnership Project (3GPP) Universal Terrestrial Radio Access Network (UTRAN) Long-Term-Evolution (LTE) or a Long-Term-Evolution (LTE) communication network, although the scope of the inventive subject matter described herein is not limited in this respect. In these broadband multicarrier embodiments, the UE 800 and the eNBs may be configured to communicate in accordance with an orthogonal frequency division multiple access (OFDMA) technique. The UTRAN LTE standards include the 3rd Generation Partnership Project (3GPP) standards for UTRAN-LTE, release 8, March 2008, and release 10, December 2010, including variations and evolutions thereof.

In some LTE embodiments, the basic unit of the wireless resource is the Physical Resource Block (PRB). The PRB may comprise 12 sub-carriers in the frequency domain×0.5 ms in the time domain. The PRBs may be allocated in pairs (in the time domain). In these embodiments, the PRB may comprise a plurality of resource elements (REs). A RE may comprise one sub-carrier x one symbol.

Two types of reference signals may be transmitted by an eNB including demodulation reference signals (DM-RS), channel state information reference signals (CIS-RS) and/or a common reference signal (CRS). The DM-RS may be used by the UE for data demodulation. The reference signals may be transmitted in predetermined PRBs.

In some embodiments, the OFDMA technique may be either a frequency domain duplexing (FDD) technique that uses different uplink and downlink spectrum or a time-domain duplexing (TDD) technique that uses the same spectrum for uplink and downlink.

In some other embodiments, the UE 800 and the eNBs may be configured to communicate signals that were transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In some embodiments, the UE 800 may be part of a portable wireless communication device, such as a PDA, a laptop or portable computer with wireless communication capability, a web tablet, a wireless telephone, a wireless headset, a pager, an instant messaging device, a digital camera, an access point, a television, a medical device (e.g., a heart rate monitor, a blood pressure monitor, etc.), or other device that may receive and/or transmit information wirelessly.

In some LTE embodiments, the UE 800 may calculate several different feedback values which may be used to perform channel adaption for closed-loop spatial multiplexing transmission mode. These feedback values may include a channel-quality indicator (CQI), a rank indicator (RI) and a precoding matrix indicator (PMI). By the CQI, the transmitter selects one of several modulation alphabets and code rate combinations. The RI informs the transmitter about the number of useful transmission layers for the current MIMO channel, and the PMI indicates the codebook index of the precoding matrix (depending on the number of transmit antennas) that is applied at the transmitter. The code rate used by the eNB may be based on the CQI. The PMI may be a vector that is calculated by the UE and reported to the eNB. In some embodiments, the UE may transmit a physical uplink control channel (PUCCH) of format 2, 2*a* or 2*b* containing the CQI/PMI or RI.

In these embodiments, the CQI may be an indication of the downlink mobile radio channel quality as experienced by the UE 800. The CQI allows the UE 800 to propose to an eNB an optimum modulation scheme and coding rate to use for a given radio link quality so that the resulting transport block error rate would not exceed a certain value, such as 10%. In some embodiments, the UE may report a wideband CQI value which refers to the channel quality of the system bandwidth. The UE may also report a sub-band CQI value per sub-band of a certain number of resource blocks which may be configured by higher layers. The full set of sub-bands may cover the system bandwidth. In case of spatial multiplexing, a CQI per code word may be reported.

In some embodiments, the PMI may indicate an optimum precoding matrix to be used by the eNB for a given radio condition. The PMI value refers to the codebook table. The network configures the number of resource blocks that are represented by a PMI report. In some embodiments, to cover the system bandwidth, multiple PMI reports may be provided. PMI reports may also be provided for closed loop spatial multiplexing, multi-user MIMO and closed-loop rank 1 precoding MIMO modes.

In some cooperating multipoint (CoMP) embodiments, the network may be configured for joint transmissions to a UE in which two or more cooperating/coordinating points, such as remote-radio heads (RRHs) transmit jointly. In these embodiments, the joint transmissions may be MIMO transmissions and the cooperating points are configured to perform joint beamforming.

The example embodiments discussed herein may be utilized by wireless network access providers of all types including, but not limited to, mobile broadband providers looking to increase cellular offload ratios for cost-avoidance and performance gains, fixed broadband providers looking to extend their coverage footprint outside of customers' homes or businesses, wireless network access providers looking to monetize access networks via access consumers or venue owners, public venues looking to provide wireless network (e.g., Internet) access, or digital services (e.g. location services, advertisements, entertainment, etc.) over a wireless network, and business, educational or non-profit enterprises that desire to simplify guest Internet access or Bring-Your-Own-Device (BYOD) access.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A method performed by a communication station (STA) for establishing an encrypted device-to-device communication session comprising:
   discovering one or more wireless networks with a wireless receiver of the STA;
   attempting, by the STA, to establish the encrypted device-to-device communication session with an access point of a wireless network of the one or more available wireless networks, in response to discovering the wireless network, by providing a pre-configured public-use credential to the access point of the wireless network;
   receiving, at the STA in response to providing the pre-configured public-use credential to the access point, an electronically signed authenticity certificate from the access point of the wireless network; and
   establishing the encrypted device-to-device communication session based at least in part on the pre-configured public-use credential;
   wherein the encrypted device-to-device communication session is unique to the STA and the access point and the public-use credential is not unique to the STA, and
   wherein establishing the encrypted device-to-device communication session is based at least in part on the pre-configured public-use credential and the electronically signed authenticity certificate.

2. The method of claim 1, further comprising:
   providing a prompt to a user, the prompt requesting the user provide a user specific credential to the STA or an instruction to provide the pre-configured public-use credential to the access point;
   receiving a response to the prompt, the response including the user specific credential or the instruction to use the pre-configured public-use credential; and
   transmitting the user specific credential or the pre-configured public-use credential to the access point based on the response.

3. The method of claim 1, wherein establishing the encrypted device-to-device communication session further comprises:
   attempting to establish the encrypted device-to-device communication session with the access point of the wireless network with a first class of credential, the first class of credential being specific to a user;
   in response to failing to connect with the first class of credential, attempting to connect to the access point with a second class of credential, the second class of credential being specific to an organization; in response to failing to establish the encrypted device-to-device communication session with the access point with the second class of credential, attempting to connect to the access point network with the pre-configured public-use credential.

4. The method of claim 1, wherein the STA is included in a user equipment (UE), and the encrypted device-to-device communication session includes a direct wireless network connection performing wireless communications in accordance with a standard from: a 3GPP Long Term Evolution or Long Term Evolution-Advanced standards family, a standard from an IEEE 802.11 standards family, a standard from an IEEE 802.16 standards family, or a standard from a Bluetooth Special Interest Group standards family.

5. The method of claim 4, wherein the UE and the access point include an encryption mechanism in accordance with a standard from an Advanced Encryption Standard (AES) family.

6. The method of claim 4, wherein the UE includes a first device comprising processing circuitry arranged to communicate with an evolved NodeB (eNB);
   wherein the wireless network includes a Long Term Evolution/Long Term Evolution-Advanced (LTE/LTE-A) network; and
   where in the UE is configured to establish an encrypted wireless connection for direct device-to-device network communications with the access point, by performing operations to communicate with a certificate authority over the L TE/LTE-A network to verify the validity of the electronically signed authenticity certificate.

7. A communication station (STA), comprising: a memory coupled to processing circuitry, the processing circuitry arranged to communicate with a wireless network and to establish an encrypted wireless connection with an access point coupled to the wireless network, by performing operations to:
   discover the wireless network;
   providing a pre-configured public-use credential to the access point, in response to discovering the wireless network;
   receive, at the STA in response to providing the pre-configured public-use credential to the access point, an electronically signed authenticity certificate from the access point of the wireless network; and
   establish the encrypted wireless connection based at least in part on the pre-configured public-use credential;
   wherein the encrypted wireless Connection is unique to the STA and the access point, and
   wherein establishing the encrypted wireless connection is based at least in part on the pre-configured public-use credential and the electronically signed authenticity certificate.

8. The STA of claim 7, further comprising:
   a user interface coupled to the processing circuitry;
   wherein the processing circuitry is further arranged to perform operations to:
     provide, via the user interface, a prompt to either provide a user specific credential to the STA or an instruction to provide the pre-configured public-use credential;
     receive, via the user interface, a response to the prompt, the response including the user specific credential or the instruction to connect with the pre-configured public-use credential; and
     transmit the response to the access point.

9. The STA of claim 7, comprising circuitry arranged to:
   attempt to establish the encrypted wireless connection with the access point of the wireless network with a first class of credential, the first class of credential being specific to a user;
   in response to failing to connect with the first class of credential, attempt to connect to the access point of the wireless network with a second class of credential, the second class of credential being specific to an organization;
   in response to failing to establish the encrypted wireless connection with the access point of the wireless network with the second class of credential, attempt to connect to the access point of the wireless network with the pre-configured public-use credential.

10. The STA of claim 7, further comprising user equipment (LT);
- wherein the encrypted wireless connection is established between a first device and the access point to create a secure wireless network connection, the secure wireless network connection performing wireless communications in accordance with a standard from: a 3GPP Long Term Evolution or Long Term Evolution-Advanced standards family, a standard from an IEEE 802.11 standards family, a standard from an IEEE 802.16 standards family, or a standard from Bluetooth Special Interest Group standards family.

11. The STA of claim 10, wherein the UE and the access point include an encryption mechanism in accordance with a standard from an Advanced Encryption Standard (AES) family.

* * * * *